United States Patent
Jones et al.

(10) Patent No.: US 10,364,789 B2
(45) Date of Patent: Jul. 30, 2019

(54) PUMPED HYDRO TOWER

(71) Applicant: Illinois Tool Works Inc., Glenview, IL (US)

(72) Inventors: Jerald Edward Jones, Golden, CO (US); Valerie Lisa Rhoades, Golden, CO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/279,119

(22) Filed: May 15, 2014

(65) Prior Publication Data

US 2015/0330355 A1    Nov. 19, 2015

(51) Int. Cl.
| | | |
|---|---|---|
| *F03B 13/06* | (2006.01) |
| *F03D 9/28* | (2016.01) |
| *F03D 9/14* | (2016.01) |
| *F03D 13/20* | (2016.01) |
| *F03D 9/25* | (2016.01) |

(52) U.S. Cl.
CPC ............... *F03B 13/06* (2013.01); *F03D 9/14* (2016.05); *F03D 9/255* (2017.02); *F03D 9/28* (2016.05); *F03D 13/20* (2016.05); *Y02E 10/22* (2013.01); *Y02E 10/725* (2013.01); *Y02E 10/728* (2013.01); *Y02E 60/17* (2013.01); *Y02P 80/158* (2015.11)

(58) Field of Classification Search
CPC .......... F03D 9/003; F03D 9/008; F03D 9/025; F03D 9/255; F03D 9/14; F03D 13/20; F03D 9/28; F03B 17/005; F03B 13/06
USPC ...................................... 290/44, 55
See application file for complete search history.

(56) References Cited

U.S. PATENT DOCUMENTS

| | | | |
|---|---|---|---|
| 2,675,211 A | 4/1954 | Regoord | |
| 2,952,340 A | 9/1960 | Schiff | |
| 3,135,363 A | 6/1964 | Bourassa | |
| 3,196,991 A | 7/1965 | Johnson | |
| 3,213,574 A | 10/1965 | Melbye | |
| 3,248,831 A | 5/1966 | Jones | |
| 3,373,473 A | 3/1968 | Keslin | |
| 3,952,467 A | 4/1976 | Partlow | |
| 4,151,534 A | 4/1979 | Bond | |
| 4,261,931 A | 4/1981 | Rothrock | |
| 4,443,707 A * | 4/1984 | Scieri | F03B 13/06 290/4 A |
| 4,478,014 A | 10/1984 | Poock | |

(Continued)

FOREIGN PATENT DOCUMENTS

| | | |
|---|---|---|
| CN | 101338726 | 1/2009 |
| CN | 101410618 | 4/2009 |

(Continued)

OTHER PUBLICATIONS

English translation of DE 10 2011 050 032 A1.*

(Continued)

*Primary Examiner* — Viet P Nguyen
(74) *Attorney, Agent, or Firm* — McAndrews, Held & Malloy, Ltd.

(57) ABSTRACT

Embodiments of the present disclosure are directed towards a power generation system having a wind power system comprising a wind tower and a pumped liquid energy storage system configured to store liquid in an interior volume of the wind tower, wherein the pumped liquid energy storage system is a closed-loop system.

19 Claims, 3 Drawing Sheets

(56) References Cited

U.S. PATENT DOCUMENTS

| | | | |
|---|---|---|---|
| 4,580,377 A | 4/1986 | Sundin | |
| 4,604,844 A | 8/1986 | Mikulas, Jr. | |
| 4,696,135 A | 9/1987 | Kallinger | |
| 4,785,309 A | 11/1988 | Gremillion | |
| 4,832,315 A | 5/1989 | Vanderklaauw | |
| 5,101,215 A | 3/1992 | Creaser, Jr. | |
| 6,782,667 B2 | 8/2004 | Henderson | |
| 7,471,010 B1* | 12/2008 | Fingersh | F03D 13/20 290/55 |
| 7,642,987 B2 | 1/2010 | Newman | |
| 7,966,777 B2 | 6/2011 | Douglas | |
| 8,143,740 B1* | 3/2012 | Simnacher | F03B 13/06 290/55 |
| 8,146,219 B2 | 4/2012 | Monostory | |
| 8,492,918 B1* | 7/2013 | Kamenov | F03B 13/06 290/43 |
| 8,919,074 B2 | 12/2014 | Meyer | |
| 9,062,662 B1* | 6/2015 | Johnson | E04H 12/342 |
| 2002/0095878 A1 | 7/2002 | Henderson | |
| 2004/0050760 A1* | 3/2004 | Siegfriedsen | F03D 9/10 210/97 |
| 2005/0005562 A1 | 1/2005 | Henderson | |
| 2005/0201855 A1* | 9/2005 | Fan | F03D 3/002 415/4.1 |
| 2005/0275225 A1* | 12/2005 | Bertolotti | F03D 9/255 290/44 |
| 2006/0273595 A1* | 12/2006 | Avagliano | F03D 7/028 290/44 |
| 2007/0024058 A1* | 2/2007 | McClintic | F03D 7/0236 290/44 |
| 2007/0114796 A1* | 5/2007 | Garces | F03D 9/008 290/43 |
| 2008/0180349 A1 | 7/2008 | Newman | |
| 2009/0087311 A1 | 4/2009 | Wyborn | |
| 2009/0107567 A1* | 4/2009 | Crary | E03B 11/02 137/560 |
| 2010/0095508 A1* | 4/2010 | Wahlen | B21C 37/065 29/428 |
| 2010/0259044 A1* | 10/2010 | Muchow | E03B 11/12 290/43 |
| 2011/0133466 A1* | 6/2011 | Kamenov | F03B 13/06 290/55 |
| 2011/0204645 A1* | 8/2011 | Jacobson | F03B 13/08 290/54 |
| 2013/0008097 A1 | 1/2013 | Margevicius | |
| 2013/0091784 A1* | 4/2013 | Schmidt | E04H 12/182 52/115 |
| 2013/0186013 A1* | 7/2013 | Jones | E04H 12/342 52/126.1 |

FOREIGN PATENT DOCUMENTS

| | | |
|---|---|---|
| CN | 101435415 | 5/2009 |
| CN | 102635480 | 8/2012 |
| DE | 19647515 | 5/1998 |
| DE | 19741988 | 4/1999 |
| DE | 102011050032 | 11/2012 |
| DE | 202012011382 | 11/2013 |
| EP | 1350953 | 10/2003 |
| EP | 1857670 | 11/2007 |
| WO | WO 2013092145 A1 * | 6/2013 ............. F01B 23/10 |

OTHER PUBLICATIONS

International Search Report from PCT application No. PCT/US2015/016515, dated Apr. 16, 2015, 10 pgs.

PCT International Search Report & Written Opinion of PCT/US2013/021887 dated Apr. 22, 2013, 12 pages.

* cited by examiner

PUMPED HYDRO TOWER

BACKGROUND

The invention relates generally to pumped-hydro energy storage, and, more particularly, to an improved system and method for pumped-hydro energy storage.

Hydroelectric power is a renewable form of energy that originates from flowing water. For example, moving water may be directed through a turbine, generator, and/or other turbomachine to generated power (e.g., electricity). As the water passes through the turbomachine, water may force rotation of blades in the turbomachine, which may then rotate a generator coupled to a shaft of the turbomachine. In this manner, kinetic energy of the water may be converted into electrical energy. Thereafter, the electrical energy may be delivered to a power grid, storage facility, or other location. In certain embodiments, water may be stored in an elevated vessel, such as a tower, container, behind a dam, or other reservoir. When power generation is desired, the force of gravity may be used to force the stored water to flow towards the turbomachine and/or generator. In other words, the potential energy of the water is converted into kinetic energy, which is then converted into electrical energy, in the manner described above. Subsequently, water may be pumped back into the elevated vessel or reservoir for future use in power generation. Unfortunately, pumped-hydro energy storage systems may be limited to certain geographical areas.

BRIEF DESCRIPTION

In a first embodiment, a power generation system includes a wind power system comprising a wind tower and a pumped-hydro energy storage system configured to store water in an interior volume of the wind tower, wherein the pumped-hydro energy storage system is a closed-loop system.

In another embodiment, a closed-loop pumped-hydro energy storage system includes a wind tower having an interior volume configured to store water, a reservoir configured to collect water flowing from the wind tower, a turbine generator disposed between the wind tower and the reservoir and configured to generate power using the water flowing from the wind tower to the reservoir, and a pump configured to pump the water from the reservoir to the interior volume of the wind tower.

In a further embodiment, a system includes a wind power system and a closed-loop pumped-hydro energy storage system. The wind power system includes a wind tower configured to store water in an interior volume of the wind tower and a wind turbine supported by the wind tower and configured to generate a first power from wind. The closed-loop pumped-hydro energy storage system includes a reservoir configured to collect water flowing from the interior volume of the wind tower, a turbine generator disposed between the wind tower and the reservoir and configured to generate a second power using the water flowing from the wind tower to the reservoir, and a pump configured to pump the water from the reservoir to the interior volume of the wind tower.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure describes a pumped-hydro energy storage system and method having a wind energy tower. For example, the wind energy tower may have a height of approximately 150 to 400 meters, and therefore may have ample room, height, and space for storing water. As will be appreciated, water may be pumped into the wind energy tower during off-peak hours when energy costs are lower or when there is an energy surplus. When power or energy generation is desired, water stored in the wind energy tower may flow, e.g., by force of gravity, through a turbine generator, thereby generating electrical power. In certain embodiments, power generation by the pumped-hydro energy storage system may be synchronized with power generation by a wind turbine of the wind energy tower. For example, the pumped-hydro energy storage system may serve as a backup power generation system to the wind turbine. That is, when the wind turbine is unable to generate a desired amount of power (e.g., due to insufficient wind), the pumped-hydro energy storage system may be used to generate additional power. In other embodiments, the wind turbine and the pumped-hydro energy storage system may both generate power at the same time, thereby increasing the peak power output of the system.

As discussed in detail below, the pumped-hydro energy storage system may be a closed loop system. That is, the pumped-hydro energy storage system may include a wind energy tower and a reservoir through which water may cycle in a closed loop. As such, the pumped-hydro energy storage may not use a natural water way or other open water source. Consequently, the pumped-hydro storage system may be suitable for use in a variety of geographical areas, including geographical locations that do not have a nearby natural water source. Additionally, as the pumped-hydro energy storage system may be a closed loop system, liquids other than water or environmentally poor water may be used. For example, liquids that are heavier than water may be used to store more energy per unit volume and/or water may be treated to enhance corrosion prevention, mold reduction, or other treatment that would be environmentally unacceptable the pumped-hydro energy storage system were an open system.

Figure 1:
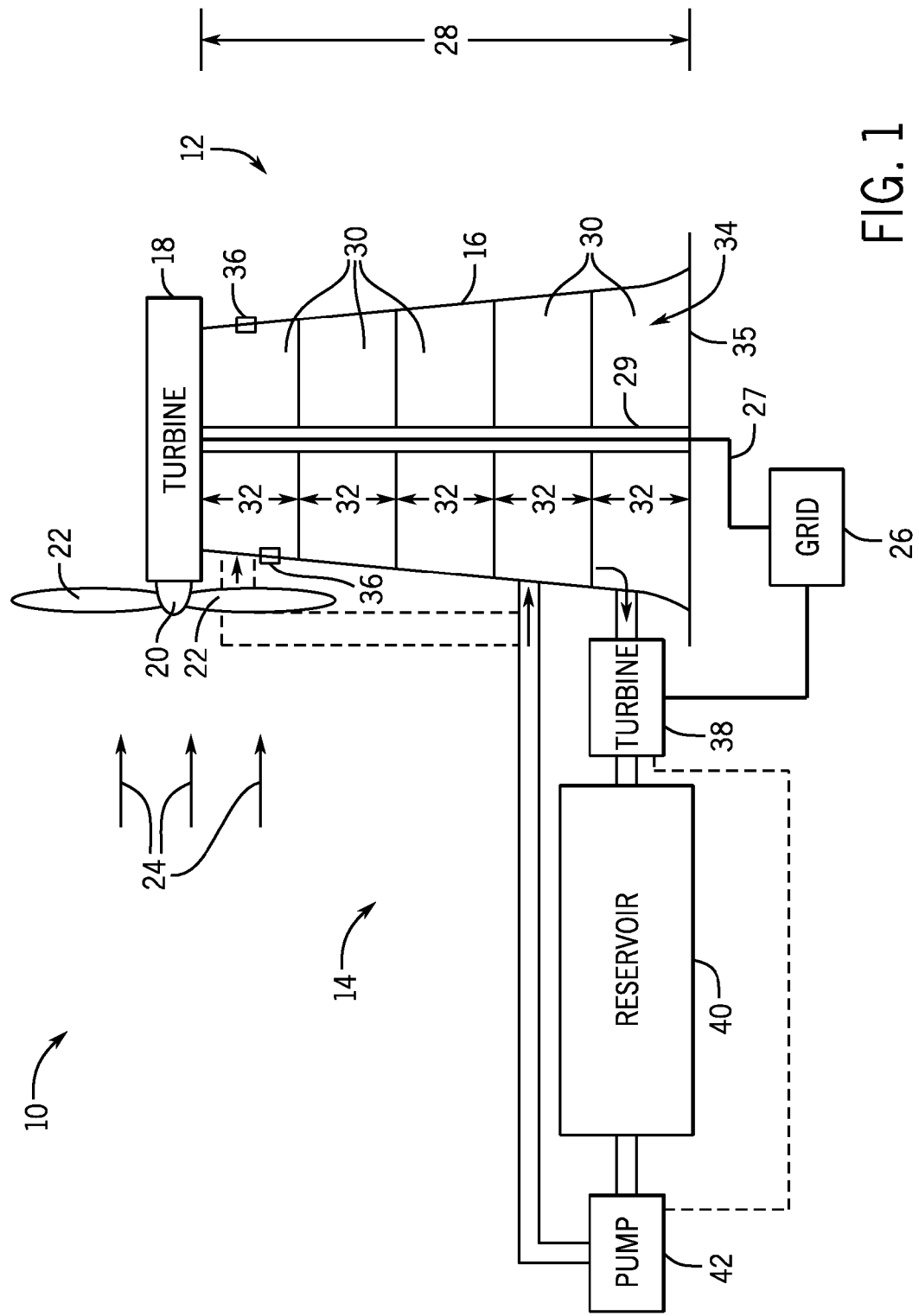
FIG. 1 is a diagrammatical representation of an embodiment of a power generation system having a pumped-hydro energy storage system.

Turning now to the drawings, FIG. 1 is a diagrammatical representation of an embodiment of a power generation system 10 including a wind power system 12 and a pumped-hydro energy storage system 14. As mentioned above, the wind power system 12 includes a wind tower 16, which supports a wind turbine 18 configured to convert wind energy into electrical energy. In the illustrated embodiment, the wind turbine 18 is a horizontal axis wind turbine, but, in other embodiments, the wind turbine 18 may be a vertical axis wind turbine. As will be appreciated, the wind turbine 18 may include a rotor coupled to a nacelle, which houses a generator. The wind turbine 18 also includes a hub 20 and blades 22 which convert the wind energy into low speed rotational energy. Specifically, as wind 24 blows past the blades 22, the blades 22, and therefore the hub 20, are driven into rotation. The hub 20 is coupled to the rotor of the turbine 18, which is further coupled to the generator of the turbine 18. As will be appreciated, the generator of the turbine 18 converts the rotational (e.g., mechanical) energy into electrical energy. In certain embodiments, the turbine 18 may include other components, such as shafts, gear boxes, additional generators, direct drives, inverters, and so forth, to facilitate the conversion of mechanical energy to electrical energy.

As shown, the turbine 18 may be further coupled to a power grid 26 and, therefore, may transfer generated electrical energy to the power grid 26 for distribution. For example, the power grid 26 may transfer electrical energy (e.g., power) to a storage facility, homes, commercial buildings, or other users of electricity. The power grid 26 may also be coupled to other systems configured to generate, supply, and/or receive power, such as a solar power plant, a nuclear power plant, or other type of power plant. In the illustrated embodiment, the turbine 18 is coupled to the power grid 26 by an electrical cable 27, which is routed through piping 29 disposed within the wind tower 16. As will be appreciated, the piping 29 may be configured to withstand hydrostatic pressures within the wind tower 16.

In the illustrated embodiment, the wind tower 16 has a height 28. Additionally, the wind tower 16 is constructed from multiple tower sections 30, which may be on-site fabricated and self-erecting. For example, the wind tower 16 may be constructed using the system and method described in U.S. patent application Ser. No. 13/720,535, which is hereby incorporated by reference. In certain embodiments, each tower section 30 has a frusto-conical, polygon, conical, corrugated, or tubular shape. For example, the wind tower 16 may include approximately 3 to 40 tower sections 30. Furthermore, the tower sections 30 each have a height 32, which may be approximately 10 to 30 meters or more. Consequently, the height 28 of the wind tower 16 may be approximately 45 to 500 meters or more. Furthermore, as the height 28 of the wind tower 16 increases, the diameter of the tower sections 30 may increase, thereby increasing the load capacity of the wind tower 16. For example, the tower sections 30 may have a diameter of approximately 20 to 50 meters or more. Additionally, as the diameter and height 32 of the tower sections 30 increases, a volume 34 inside the wind tower 16 increases. As such, the volume 34 inside the wind tower 16 may be suitable for storing ample water for use in the pumped-hydro energy storage system 14 (e.g., 125 or more meters of head). While the above discussion describes the wind tower 16 formed from multiple tower sections 30 (e.g., steel tower sections), other embodiments of the wind tower 16 may be formed from concrete or other materials. Additionally, other structures may be used for storing water for the pumped hydro storage system 14, such as grain elevators.

As the wind tower 16 may be used to store water for the pumped-hydro energy storage system 14, the wind tower 16 may include features to make the volume 34 within the wind tower 16 suitable for storing water. For example, the tower sections 30 may be welded to one another to reduce leaks between the tower sections 30. Additionally, each tower section 30 may be formed from a corrosion resistant material and may be of suitable thickness to withstand hydrostatic forces of water stored within the wind tower 16. In certain embodiments, the wind tower 16 may include a liner made from a corrosion resistant material, such as rubber or other polymer, disposed within an interior of the wind tower 16 to hold and store water. The wind tower 16 may be erected on a foundation 35, which may be formed from concrete or other non-permeable material. Furthermore, the wind tower 16 may include vents 36 to facilitate pressure equalization between the volume 34 within the wind tower 16 and the surrounding environment (e.g., outside the wind tower 16).

As mentioned above, the pumped-hydro energy storage system 14 may be a closed loop system that stores water within the volume 34 of the wind tower 16 for use in generating electric power. In the illustrated embodiment, water in the pumped-hydro energy storage system 14 is stored within the volume 34 of the wind tower 16. When power generation using the pumped-hydro energy storage system 14 is desired (e.g., during a lull in power generation by the wind power system 12), water stored in the wind tower 16 flows through a turbine 38 of the pumped-hydro energy storage system 14. For example, the turbine 38 of the pumped-hydro energy storage system 14 may have the substantially the same or similar power generation capacity as the turbine 18 of the wind power system 12 (e.g., within 0 to 20 percent, 1 to 15 percent, 2 to 10 percent, or 3 to 5 percent of one another). As a result, the pumped-hydro energy storage system 14 may be capable of fully substituting for the wind power system 12, as necessary. Accordingly, the turbine 38 may also be coupled (e.g., electrically coupled) to the power grid 26. In certain embodiments, however, the wind tower 16 may not include the turbine 38 and/or the turbine 18. In such embodiments, the wind tower 16 may be used for storing water.

After the water flows through the turbine 38, the water may be collected in a reservoir 40. For example, the reservoir 40 may be a tank (e.g., above or below ground), artificial pond or lake, or other containment cache. As the pumped-hydro energy storage system 14 may not use a natural water source, water for the pumped-hydro energy storage system 14 may be shipped to the power generation system 10 site. As desired, the water in the reservoir 40 may then be pumped back into the volume 34 of the wind tower 16 by a pump 42. For example, it may be desirable to pump water from the reservoir 40 to the wind tower 16 when energy costs are lower, when the wind power system 12 is capable of providing sufficient or desired power to the power grid 26, and/or when the power generation system 10 has generated an energy surplus. In certain embodiments, the pump 42 may be powered by the turbine 38 and/or the turbine 18. Furthermore, as shown, the water pumped into the wind tower 16 by the pump 42 may be directed into the volume 34 at various points along the height 28 of the wind tower 16 (e.g., near a base of the wind tower 16 or near a top of the wind tower 16).

Figure 2:
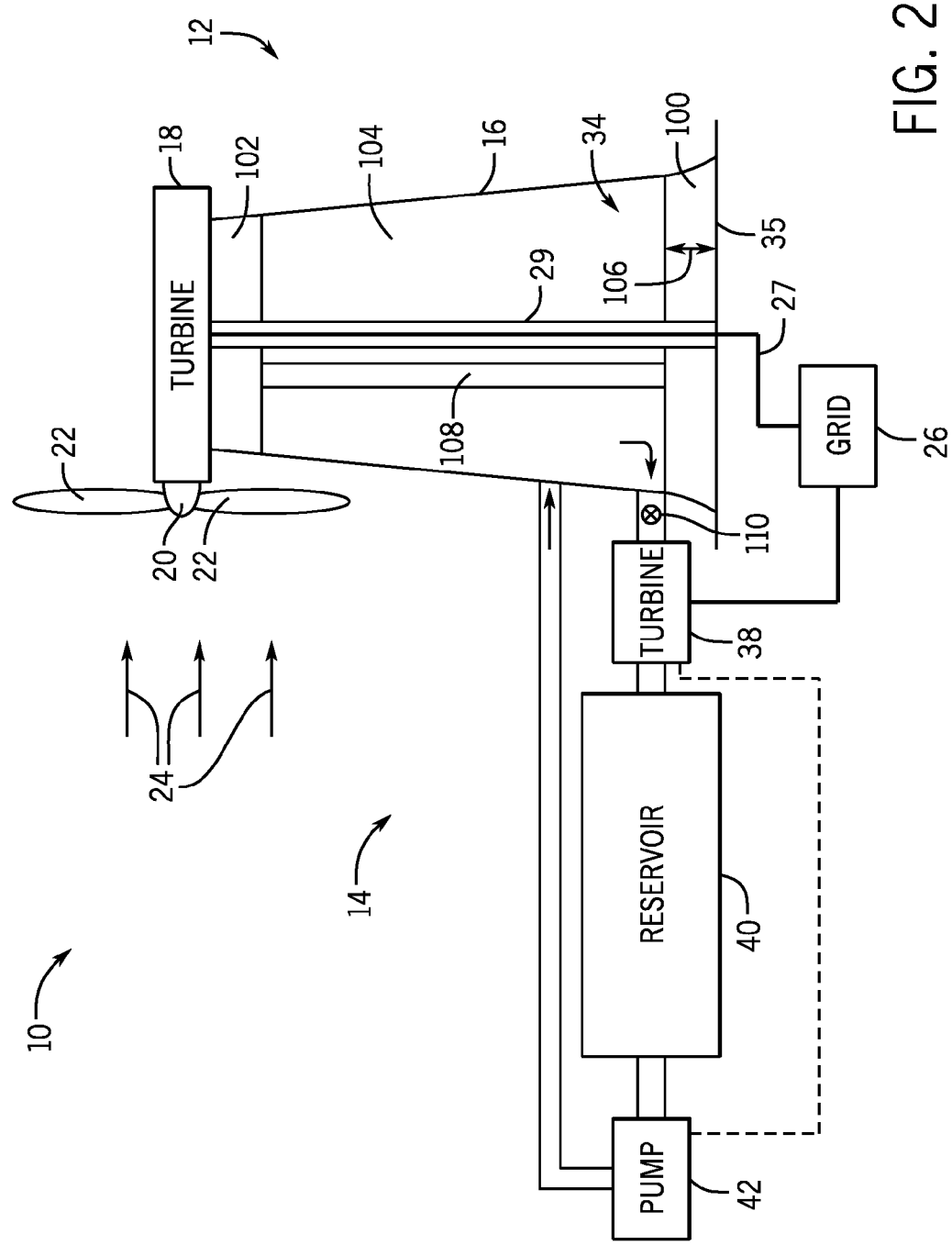
FIG. 2 is a diagrammatical representation of an embodiment of a power generation system having a pumped-hydro energy storage system.

FIG. 2 is a diagrammatical representation of an embodiment of the power generation system 10 including the wind power system 12 and the pumped-hydro energy storage system 14. In the illustrated embodiment, the volume 34 within the wind tower 16 includes a lower dry section 100 and an upper dry section 102. That is, the lower dry section 100 and upper dry section 102 of the volume 34 within the wind tower 34 may be separated from a water storage portion 104 of the volume 34 and may not store any water. As a result, the lower and upper dry sections 100 and 102 may be accessible to users and/or operators for maintenance or other uses. In certain embodiments, the lower and upper dry sections 100 and 102 may be separated from the water storage portion 104 of the volume 34 by platforms, seals, and/or other barriers.

In certain embodiments, the turbine 38 of the pumped-hydro energy storage system 14 may require a certain amount of "head" of water to operate. For example, the turbine 38 may require approximately 15 meters of head of water to function. Accordingly, a height 106 of the lower dry section 100 may be selected to provide the minimum head of water to operate the turbine 38 (e.g., 15 meters). The lower dry section 100 may be accessible from an exterior of the wind tower 16 via a door, hatch, or other opening, for maintenance, repair, replacement, and so forth. In this manner, operators or other workers may access the lower dry section 100, as necessary. Similarly, the upper dry section 102 may be accessible via a hatch, door, or other opening, thereby enabling access to the turbine 18 and other components of the wind power system 18 for maintenance, repair, replacement, and so forth. For example, the upper dry section 102 may be accessed via a ladder external to the volume 34. In other embodiments, the volume 34 of the wind tower 16 may include a dry shaft 108 extending from the lower dry section 100 to the upper dry section 102 through the water storage portion 104. A ladder, stairs, or other mechanism may be disposed within the dry shaft 108 to enable access to the upper dry portion 102.

In the illustrated embodiment, the pumped-hydro energy storage system 14 also includes a backflow valve 110 disposed between the wind tower 16 and the turbine 38 or pump 42. As will be appreciated, the backflow valve 110 is configured to block flow of water from the turbine 38 back to the volume 34 of the wind tower 16. As a result, the backflow valve 110 may protect against damage to the turbine 38 that may be caused by improper or undesired flow of water (e.g., reverse water flow). In certain embodiments, the backflow valve 110 may be an on/off valve. Additionally, in some embodiments, a check valve may be disposed between the pump 42 and the wind tower 16.

Figure 3:
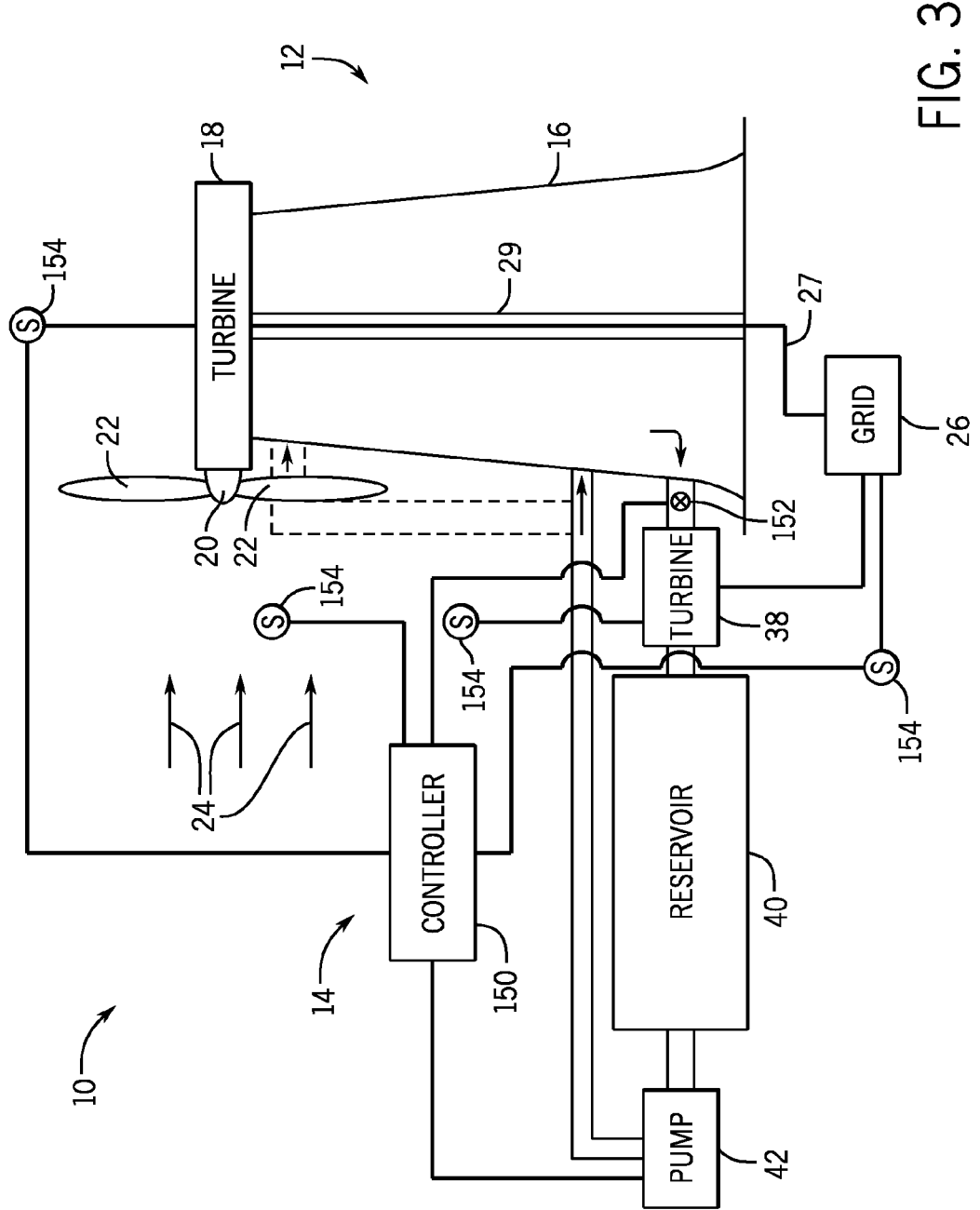
FIG. 3 is a diagrammatical representation of an embodiment of a power generation system having a pumped-hydro energy storage system.

FIG. 3 is a diagrammatical representation of an embodiment of the power generation system 10 including the wind power system 12 and the pumped-hydro energy storage system 14. More specifically, the power generation system 10 in the illustrated embodiment includes a controller 150 configured to regulate operation of various components of the power generation system. As mentioned above, the controller 150 may regulate when the wind power system 12 is used for power generation and when the pumped-hydro energy storage system 14 is used for power generation. To this end, the controller 150 may regulate operation of the turbine 18 of the wind power system 12. Additionally, the controller 150 may regulate operation of a valve 152 (which may or may not be the same valve as valve 110) of the pumped-hydro energy storage system 14 (e.g., to allow and/or block water flow from the wind tower 16 to the turbine 38), the turbine 38, and the pump 42 of the pumped-hydro energy storage system 14.

Additionally, the controller 150 may control operation of various components of the power generation system 10 based on feedback from the power generation system 10. More specifically, the power generation system 10 may include one or more sensors 154 configured to measure one or more operating parameters of the power generation system 10. For example, the sensors 154 may be configured to measure a speed of the wind 24, a power output of the turbine 18 of the wind power system 12, a power output of the turbine 38 of the pumped-hydro energy storage system 14, an amount of power being supplied to the power grid 26, particular conditions of the water, and so forth. In this manner, the controller 150 may optimize and/or coordinate operation of the wind power system 12 and pumped-hydro energy storage system 14 to improve efficiency and cost effectiveness of the power generation system 10. For example, the controller 150 may operate the pumped-hydro energy storage system 14 to generate power when one of the sensors 154 detects a wind 24 speed below a predefined threshold. Similarly, if one of the sensors 154 detects power output of the turbine 18 of the wind power system 12 below a certain threshold, the controller may open the valve 152 to enable power generation using the pumped-hydro energy storage system 14. Furthermore, during a period of reduced or lowered energy costs, which the controller 150 may monitor based on user input, an internet connection, or the like, the controller 150 may operate the pump 42 to pump water from the reservoir 40 back into the wind tower 16. In this manner, the controller 150 may regulate operation of the power generation system 10 to improve overall power output to the power grid 26, to improve cost effectiveness and efficiency of the power generation system 10, and so forth. Furthermore, during a period of raised or higher energy costs, which the controller 150 may monitor based on user input, an internet connection, or the like, the controller 150 may operate the turbine 38 to generate power to supply to the grid to optimize the value of the energy generated.

In other embodiments, power generated by the turbine 38 may be used to power other external systems. For example, the power generated by the turbine 38 may be used to power on-site machinery, such as machinery for producing goods, for energy processes (e.g., creating methanol from carbon dioxide and hydrogen), for operating transportation systems, such as an electric rail or inductively coupled electric automobiles, for operating farm or ranch machinery, such as electric tractors or animal feeding systems, or for other systems, uses, or purposes.

As discussed in detail above, the present embodiments are directed towards the power generation system 10 including the wind power system 12 and the pumped-hydro energy storage system 14. More specifically, the pumped-hydro energy storage system 14 is a closed-loop pumped-hydro system that stores water in the interior volume 34 of the wind tower 16 of the wind power system 12. In other words, the pumped-hydro energy storage system 14 may not include any external inputs or outputs of water. Accordingly, the pumped-hydro energy storage system 14 may not include use of a natural water source, thereby enabling the power generation system 10 to be used in a wide range of geographic locations. For example, the closed-loop may be formed by the reservoir 40, the interior volume 34 of the wind tower 16, the turbine 38, the pump 42, and any conduits, pipes, or other components disposed between them. When desired, the water stored in the interior volume 34 of the wind tower 16 may be directed through the turbine 38 of the pumped-hydro energy storage system 14 to generate power. Thereafter, the water may be directed into the reservoir 40 until the water is pumped back into the wind tower 16 by the pump 42. For example, the pumped-hydro energy storage system 14 may be operated to generate power when the wind power system 12 is unable to produce a desired level of power (e.g., due to low wind levels). Additionally, the pump 42 may be operated to pump water from the reservoir 40 back into the volume 34 of the wind tower 16 when energy prices are lower and/or when the power generation system 10 has produced an energy surplus.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system, comprising:
   a wind power system comprising a wind tower;
   a pumped liquid energy storage system configured to store liquid in an interior volume of the wind tower, wherein the interior volume is defined by at least one tower body section of a plurality of tower body sections of the wind tower, the at least one tower body section of the plurality of tower body sections is configured to contain the liquid, the at least one tower body section comprises an inner surface exposed to the interior volume and an exterior surface exposed to an environment surrounding the wind tower, and the at least one tower body section comprises a frusto-conical shape from a first axial end to a second axial end of the at least one tower body section;
   wherein the pumped liquid energy storage system comprises a reservoir configured to collect liquid flowing through a turbine generator from the interior volume of the wind tower and a pump configured to pump liquid from the reservoir into the interior volume of the wind tower;
   one or more sensors configured to measure one or more operating parameters including a speed of the wind, a power output of a turbine of the wind power system, a power output of the turbine generator of the pumped-liquid energy storage system, and an amount of power being supplied to the power grid; and
   a controller to control operation of the wind power system and the pumped liquid energy storage system based on feedback associated with the one or more operating parameters from one or more sensors of the power generation system.

2. The power generation system of claim 1, wherein the wind tower comprises a height of at least approximately 150 meters.

3. The power generation system of claim 1, wherein the pumped liquid energy storage system is a closed-loop system.

4. The power generation system of claim 1, wherein the plurality of tower body sections comprises a plurality of frusto-conical tower body sections welded to one another.

5. The power generation system of claim 1, wherein the turbine of the wind power system and the turbine generator of the pumped-liquid energy storage system have substantially the same power generation capacity.

6. The power generation system of claim 5, wherein the turbine of the wind power system and the turbine generator of the pumped-liquid energy storage system are each coupled to a power grid, the controller further configured to regulate output from each of the turbine of the wind power system and the turbine generator of the pumped-liquid energy storage system to provide a minimum threshold power output to the power grid.

7. The power generation system of claim 1, wherein the turbine generator supplies power to the pump.

8. The power generation system of claim 1, wherein the one or more operating parameters further comprises a condition of the water.

9. The power generation system of claim 1, wherein the controller operates the pumped-hydro energy storage system to generate power in response to one of the sensors detecting a wind speed below a predefined threshold at the wind power system.

10. A closed-loop pumped liquid energy storage system, comprising:
    a wind tower comprising an interior volume configured to store liquid, wherein the interior volume is defined by at least one tower section of a plurality of tower sections of the wind tower, the at least one tower section of the plurality of tower sections comprises a liquid storage portion configured to contain the liquid, the at least one tower section comprises an inner surface exposed to the interior volume and an exterior surface exposed to an environment surrounding the wind tower, and the at least one tower section comprises a frusto-conical shape from a first axial end to a second axial end of the at least one tower section, wherein the interior volume comprises a lower dry section below the liquid storage portion, an upper dry section above the liquid storage portion, and a dry shaft extending from the lower dry section to the upper dry section through the liquid storage portion, wherein the dry shaft comprises a mechanism for personnel access between the lower dry section and the upper dry section;
    a reservoir configured to collect liquid flowing from the wind tower;
    a turbine generator disposed between the wind tower and the reservoir and configured to generate power using the liquid flowing from the wind tower to the reservoir; and
    a pump configured to pump the liquid from the reservoir to the interior volume of the wind tower.

11. The closed-loop pumped liquid energy storage system of claim 10, wherein the wind tower is at least approximately 150 meters tall.

12. The closed-loop pumped liquid energy storage system of claim 10, wherein the lower dry section extends from a foundation of the wind tower to the liquid storage portion of the wind tower, and the lower dry section comprises a height of at least approximately 15 meters.

13. The closed-loop pumped liquid energy storage system of claim 10, wherein the pump is powered by the turbine generator.

14. The closed-loop pumped liquid energy storage system of claim 13, comprising a backflow valve disposed between the pump and the wind tower, wherein the backflow valve is configured to block liquid flow from the pump to the wind tower.

15. A system, comprising:
    a wind power system, comprising:
    a wind tower configured to store liquid in an interior volume of the wind tower, wherein the interior volume is defined by at least one tower section of a plurality of tower sections of the wind tower, the at least one tower section of the plurality of tower sections is configured to contain the liquid, the at least one tower section comprises an inner surface exposed to the interior volume and an exterior surface exposed to an environment surrounding the wind tower, and the each tower section of the plurality of tower sections comprises a frusto-conical shape from a first axial end to a second axial end of the respective tower section; and
    a wind turbine supported by the wind tower and configured to generate a first power output from wind;
    a pumped liquid energy storage system, comprising:
    a reservoir configured to collect liquid flowing from the interior volume of the wind tower;

a turbine generator disposed between the wind tower and the reservoir and configured to generate a second power output using the liquid flowing from the wind tower to the reservoir; and a pump configured to pump the liquid from the reservoir to the interior volume of the wind tower; and one or more sensors configured to measure one or more operating parameters of the power generation system including a speed of the wind, a power output of the wind turbine of the wind power system, a power output of the turbine generator of the pumped liquid energy storage system, and an amount of power being supplied to the power grid, wherein the power system activates the turbine generator to generate the second power output in response to the one or more sensors measuring the first power output below a threshold power output level.

16. The system of claim 15, wherein the plurality of tower sections comprises a plurality of tubular tower sections, and wherein the plurality of tubular tower sections are welded to each another.

17. The system of claim 15, wherein the wind tower comprises a height of at least approximately 150 meters.

18. The system of claim 15, wherein the first power output and the second power output are supplied to a power grid.

19. The system of claim 15, wherein the pumped liquid energy storage system comprises a backflow valve disposed between the wind tower and the pump.

* * * * *